US012506719B2

(12) United States Patent
Le Bouthillier et al.

(10) Patent No.: US 12,506,719 B2
(45) Date of Patent: Dec. 23, 2025

(54) SYSTEM AND METHOD FOR SECURE COLLECTION AND DISPLAY OF SENSITIVE DATA

(71) Applicant: QOHASH INC., Quebec (CA)

(72) Inventors: Jean Le Bouthillier, Quebec (CA); Luca Perico, Quebec (CA)

(73) Assignee: QOHASH INC., Quebec (CA)

( * ) Notice: Subject to any disclaimer, the term of this patent is extended or adjusted under 35 U.S.C. 154(b) by 603 days.

(21) Appl. No.: 17/897,034

(22) Filed: Aug. 26, 2022

(65) Prior Publication Data

US 2023/0116631 A1 Apr. 13, 2023

Related U.S. Application Data

(60) Provisional application No. 63/260,637, filed on Aug. 27, 2021.

(51) Int. Cl.
*H04L 9/40* (2022.01)
(52) U.S. Cl.
CPC .............. *H04L 63/0442* (2013.01)
(58) Field of Classification Search
CPC ............ G06F 21/6209; G06F 21/6245; G06F 21/6272; H04L 63/0442
USPC ........................................................ 726/26
See application file for complete search history.

(56) References Cited

U.S. PATENT DOCUMENTS

| | | | |
|---|---|---|---|
| 5,495,533 A | 2/1996 | Linehan et al. | |
| 9,397,983 B2 | 7/2016 | Moffat | |
| 9,503,433 B2 | 11/2016 | Nayshtut et al. | |
| 9,614,670 B1 | 4/2017 | Ghetti et al. | |
| 9,973,484 B2 | 5/2018 | Reid et al. | |
| 9,990,512 B2 | 6/2018 | Erofeev et al. | |
| 10,255,445 B1 | 4/2019 | Brinskelle | |
| 11,893,128 B2* | 2/2024 | Liu | G06F 21/602 |
| 2006/0075228 A1 | 4/2006 | Black et al. | |
| 2014/0047556 A1 | 2/2014 | Davis | |
| 2015/0326569 A1 | 11/2015 | McNulty | |
| 2017/0317823 A1 | 11/2017 | Gandhi | |
| 2018/0041338 A1* | 2/2018 | Nighswander | H04L 9/0825 |
| 2018/0295109 A1 | 10/2018 | Wang | |

(Continued)

FOREIGN PATENT DOCUMENTS

WO 2020190246 A1 9/2020

OTHER PUBLICATIONS

European Patent Office, "Search Report" in Application No. 22192272. 7-1213, Jan. 27, 2023, 6 pages.

*Primary Examiner* — Benjamin A Kaplan
(74) *Attorney, Agent, or Firm* — Davis Wright Tremaine LLP

(57) ABSTRACT

Systems for collecting and securely transmitting and displaying sensitive data are described. In a described configuration, the system includes service provider software deployed to a customer endpoint for detecting sensitive data and encrypting the same to produce a cryptogram, at least one service provider server for receiving and storing cryptograms for later access, and a client deployed to a consumption device for requesting cryptograms from the at least one service provider server, transmitting the cryptogram to a customer decryption module for decryption, and for displaying the decrypted sensitive data via the consumption device. Corresponding methods and computer-readable media are also described.

20 Claims, 10 Drawing Sheets

(56) References Cited

U.S. PATENT DOCUMENTS

| | | |
|---|---|---|
| 2019/0392117 A1 | 12/2019 | Viswanathan et al. |
| 2021/0029096 A1 | 1/2021 | Hart et al. |
| 2021/0089676 A1 | 3/2021 | Ford et al. |
| 2023/0050944 A1* | 2/2023 | Martinez De La Cruz .................. G06F 21/6209 |

* cited by examiner

IBAN Number (ML).docx

IBAN Number (ML).docx                                          Last Scanned       File Size
                                                                   14 days ago        27.0 kB Location
C:/terraform/stress-test-payload/IBAN Numbers/IBAN Number (ML).docx Date Created              Date Modified                 Last Accessed
Apr. 21, 2021, 1:31 PM    Jun. 10, 2020, 3:32 PM        Apr. 21, 2021, 3:00 PM Last Scanned
Apr. 21, 2021, 7:59 PM

Unique Information

Info Type  [ All unique information ▼ ]    ⬤ Hide Unlikely Matches

∨ Bank Account Number                            7 unique matches

Malian IBAN (1000)

(0.25) 32389732498798723489.7  ML64A190976656516546566654651  ML85Q41490834589734.3
  (0.25) 895348758934759875753  ML08J1145569819819826198134.54  ML57L235890237568927.39

Fetch 2 more

FIG. 7

SYSTEM AND METHOD FOR SECURE COLLECTION AND DISPLAY OF SENSITIVE DATA

CROSS REFERENCE TO RELATED APPLICATION

This application claims priority to and the benefit of U.S. Provisional Patent Application No. 63/260,637, filed Aug. 27, 2021, entitled "SYSTEM AND METHOD FOR SECURE COLLECTION AND DISPLAY OF SENSITIVE DATA," the entirety of which is hereby incorporated by reference.

TECHNICAL FIELD

The technical field generally relates to managing sensitive data in computer systems, and more specifically to systems and methods for detecting, extracting, and securely storing and displaying such sensitive data.

BACKGROUND

Organizations are facing a rapid increase in data volume, velocity, and value, making data security more important then ever. Different tools exist to help organizations increase their visibility and control over their data, such as tools that find and keep track of sensitive data.

Unfortunately, due to security concerns, existing tools typically show generic results about files, e.g., reporting a file with 100 credit card numbers, but with no specific information about what credit card and the context of the detection. Without specific details on the results, analysts need to perform extra validation steps to ascertain the validity of a match, making the analysts process inefficient and cumbersome.

SUMMARY

According to an aspect, a method for collecting and securely transmitting sensitive data is provided. The method includes: detecting, on a first device, sensitive data within a data asset accessible via said first device; extracting the sensitive data from the data asset and encrypting the sensitive data on the first device using a first key of an asymmetric key pair to produce a cryptogram; transmitting the cryptogram to a second device that is different than the first device; storing the cryptogram on persistent storage associated with the second device; receiving a request from a third device to receive the cryptogram from the persistent storage; transmitting the cryptogram to the third device; transmitting the cryptogram from the third device to a decryption module associated with the first device; decrypting the cryptogram via the decryption module using a second key of the asymmetric key pair to expose the sensitive data; and transmitting the sensitive data from the decryption module to the third device. In an embodiment, the method includes displaying the sensitive data via the third device. In an embodiment, the sensitive data is deleted from the third device after it is displayed.

According to an aspect, a method for collecting and securely transmitting sensitive data is provided. The method includes: transmitting, from a third device to a second device, a request to view sensitive data collected from a first device; receiving, from the second device, a cryptogram containing the sensitive data collected from the first device and encrypted by the first device using a first key of an asymmetric key pair; transmitting the cryptogram from the third device to a decryption module associated with the first device for decryption using a second key of the asymmetric key pair; and receiving, by the third device, the decrypted sensitive data from the decryption module. In an embodiment, the method includes displaying the sensitive data via the third device. In an embodiment, the sensitive data is deleted from the third device after it is displayed.

According to an aspect, a non-transitory computer-readable medium is provided, the medium having instructions stored thereon which, when executed, cause one or more processors to carry out the methods described above.

According to an aspect, a system for collecting and securely transmitting sensitive data is provided. The system includes a customer endpoint, a customer decryption module, a service provider server and a consumption device. The customer endpoint includes: a data surveillance module configured to detect and extract sensitive data from data assets accessible via the customer endpoint; and a data encryption module configured to encrypt the sensitive data using a first key of an asymmetric key pair to produce a cryptogram. The customer decryption module is configured to decrypt the cryptogram using a second key of the asymmetric key pair. The service provider server includes: a data collection module configured to receive the cryptogram from the customer endpoint; a secure storage module configured to store the cryptogram for later access; and a consultation module configured to receive requests to receive the sensitive data and, in response thereto, to transmit the cryptogram containing the sensitive data. The consumption device includes a client configured to: receive the cryptogram from the service provider server; transmit the cryptogram to the customer decryption module for decryption; and receive decrypted sensitive data from the customer decryption module. In some embodiments, the client is configured to display the decrypted sensitive data on a display associated with the consumption device. In some embodiments, the client is configured to delete the sensitive data from the consumption device after it is displayed.

According to an aspect, a system for collecting and securely transmitting sensitive data is provided. The system includes: a data collection module configured to receive cryptograms from a first device, the cryptograms being encrypted by the first device using a first key of an asymmetric key pair; a secure storage module configured to store received cryptograms; a consultation module configured to receive requests from a third device to receive the sensitive data, and in response thereto: retrieve the cryptograms from the secure storage module; and transmit the cryptograms to the third device along with instructions to cause the third device to transmit the cryptograms to a decryption module associated with the first device for decryption and to receive decrypted sensitive data therefrom. In some embodiments, the instructions cause the decrypted sensitive data to be displayed on the third device. In some embodiments, the instructions cause the sensitive data to be deleted from the third device after being displayed.

According to an aspect, a system for collecting and securely transmitting and displaying sensitive data is provided. The system includes service provider software deployed to a customer endpoint, the service provider software including: a data surveillance module configured to detect and extract sensitive data from a data asset accessible via the customer endpoint; and a data encryption module configured to encrypt the sensitive data using a first key of an asymmetric key pair to produce a cryptogram. The system also includes at least one service provider server in operative communication with the customer endpoint, the at least one service provider server including: a data collection module configured to receive the cryptogram from the customer endpoint; a secure storage module configured to store the cryptogram for later access; and a consultation module configured to receive a request for sensitive data and, in response thereto, retrieve the cryptogram containing the sensitive data from the secure storage module and transmit the cryptogram. The system further includes a client deployed to a consumption device in operative communication with a customer decryption module and the at least one service provider server, the client configured to: transmit a request for sensitive data to the at least one service provider server, and receive the cryptogram therefrom; transmit the cryptogram to the customer decryption module for decryption using a second key of the asymmetric key pair; receive decrypted sensitive data from the customer decryption module; and display the decrypted sensitive data.

According to an aspect, a method for securely transmitting and displaying sensitive data is provided. The method includes: transmitting, from a third device, a request to a second device for sensitive data collected from a first device; receiving, by the third device, a cryptogram from the second device, the cryptogram containing the sensitive data collected from the first device and encrypted by the first device using a first key of an asymmetric key pair; transmitting, by the third device, the cryptogram to a decryption module associated with the first device for decryption using a second key of the asymmetric key pair; receiving, by the third device, the decrypted sensitive data from the decryption module; and displaying the decrypted sensitive data via the third device.

According to an aspect, a non-transitory computer-readable medium is provided. The computer-readable medium has instructions stored thereon that, when executed by a processor of a computing device, cause the computing device to carry out a method for transmitting and displaying sensitive data, including: transmitting, from the computing device, a request to a second device for sensitive data collected from a first device; receiving, by the computing device, a cryptogram from the second device, the cryptogram containing the sensitive data collected from the first device and encrypted by the first device using a first key of an asymmetric key pair; transmitting, by the computing device, the cryptogram to a decryption module associated with the first device for decryption using a second key of the asymmetric key pair; receiving, by the computing device, the decrypted sensitive data from the decryption module; and displaying the decrypted sensitive data via the computing device.

BRIEF DESCRIPTION OF THE DRAWINGS

FIG. 7 is an exemplary user interface of a search results detail page, showing sensitive data along with corresponding context information.

DETAILED DESCRIPTION

Figure 1:
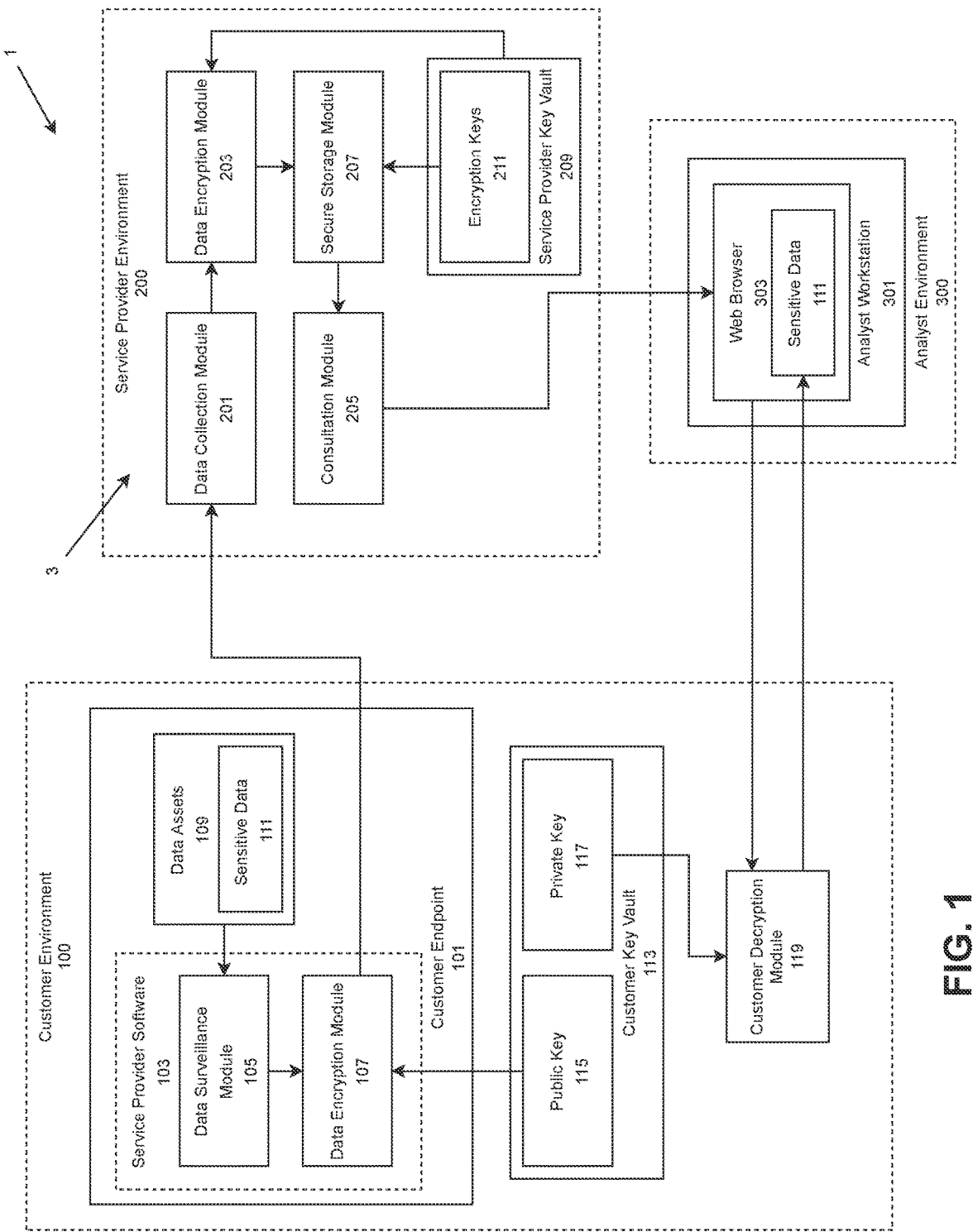
FIG. 1 is a block diagram illustrating a system for secure collection and display of sensitive data, according to an embodiment.

With reference to FIG. 1, an exemplary system 1 for secure collection and display of sensitive data is shown according to an embodiment. Broadly described, the system 1 is configured to monitor sources of data within a customer environment 100 for the presence of sensitive data. When such sensitive data is detected on a data source, the data is collected, encrypted and forwarded to a service provider environment 200 for storage. In the illustrated system 1, the collected data can later be retrieved for display in an analyst environment 300, for example to allow a security analyst to review potentially sensitive data within the customer environment 100 as needed, such as to assess data security, prevent potential leaks, trace the source of a leak, etc. It is appreciated, however, that this is for exemplary purposes only and that in other embodiments, the data can be retrieved for display and/or consumption by an authorized party for other purposes. Accordingly, analyst environment 300 can also be more generally referred to as a consumption environment. As will be discussed in more detail hereinafter, the system 1 is configured to allow sensitive data to be displayed and/or consumed while maintaining strict data privacy controls.

In the following description, the customer environment 100 refers to a secured information technology (IT) environment that includes technological components controlled by a customer. Such components can include hardware and software to implement the customer's IT infrastructure, such as workstations, servers, storage, networking equipment, etc. Such equipment can communicate via a single physical or virtual network, or multiple networks controlled by the customer. The equipment can be located on the customers premises, and/or can be distributed. For example, the customer environment 100 can include computing components, such as workstations, that employees can use for remote work. As another example, customer environment 100 can include hardware and/or software provided as a service to customer, such as cloud computing solutions, cloud storage solutions, and/or other cloud services.

The service provider environment 200 and analyst environment 300 refer to similar IT environments that are respectively controlled by a service provider and by an analyst instead of the customer. As can be appreciated, service provider environment 200 can include hardware and/or software components that are on a different physical or logical premises than hardware and/or software components of analyst environment 300 and/or of customer environment 100. In the foregoing description, various modules of the customer 100, service provider 200 and analyst 300 environments will be described. As can be appreciated, such modules can be implemented as part of one or more of the above-described hardware and/or software components within such environments 100, 200 and 300. In some embodiments, the modules can be provided as part of one or more non-transitory computer-readable media containing instructions, which executed, cause a computing hardware component to implement the functionality of the modules.

As can be appreciated, the customer environment 100 can include many different sources of data that may need to be monitored for sensitive data. Such sources of data can include, for example, employee workstations, servers, and cloud services, among others. In the illustrated embodiment, the source of data being monitored is a customer endpoint 101, such as an employee workstation. The employee workstation can be located on the customer's premises or can be at an employee's home while working remotely and connected to the customer's IT environment via a Virtual Private Network (VPN). Although a particular data source will be described, it is appreciated that it is for exemplary purposes only and that the foregoing description can also apply to other sources of data, such as cloud resources, including Microsoft cloud services such as OneDrive, Outlook, etc.

The customer endpoint 101 is provided with software that is configured to detect and collect sensitive data. Although the software is installed and/or executed on customer endpoint 101 (for example loaded in memory and executed by a processor associated with the customer endpoint 101), the software can be controlled and/or maintained by the service provider. This software and can thus be referred to as service provider software 103. As can be appreciated, the service provider software 103 can include a plurality of software modules that allow the customer endpoint 101 to detect sensitive data and securely transmit it offsite to the service provider environment 200.

In the illustrated embodiment, the software 103 includes a data surveillance module 105 that is configured to monitor data assets 109. As can be appreciated, data assets 109 can correspond to any type of digital data capable of being interpreted by and/or stored on a computer system. For example, data assets can include files (such as pictures, videos, text files, log files, documents, source code, etc.), databases (including database structures and records stored therein), and streams (including audio, video, or any other type of data stream such as channel, event log, and log streams), among others. The data surveillance module 105 can be configured to monitor data assets 109 stored locally on the customer endpoint 101 and/or data assets 109 accessible via the customer endpoint 101, such as a network or cloud drive.

The surveillance module 105 scans data assets 109 in order to identify and track data of interest contained therein, such as a notable section of a data asset 109 or individual data element contained within data asset 109. As can be appreciated, portions of data assets 109 can be considered as being of interest based on a configurable set of rules, such as if the portion contains a specified type of information and/or matches a defined pattern or structure.

In the present embodiment, the data of interest tracked by surveillance module 105 relates to sensitive customer information and is thus referred to as sensitive data 111. Such sensitive data 111 can include, for example, personal information such as social security numbers, credit card numbers, driver's license number, telephone numbers, etc. As can be appreciated this type of sensitive data 111 can exist as sequences of characters or a string having particular format. Accordingly, sensitive data 111 can be identified by surveillance module 105 using regular expressions or other text-based pattern recognition techniques. In some cases, sensitive data 111 can be contained within data assets 109 corresponding to text-based files (i.e. files of any format containing at least some binary data corresponding to encoded characters), and the surveillance module 105 can scan the binary data contained within the file to look for sensitive data 111. In other cases, the surveillance module 105 can process data assets 109 to extract data therefrom and identify sensitive data 111 in the extracted data. By way of example, if data asset corresponds to an image, surveillance module 105 can apply optical character recognition (OCR) to identify text data contained therein, and then identify sensitive data 111 contained in said text. As another example, if data asset corresponds to an audio file, surveillance module 105 can apply voice recognition to convert spoken phrases to text data, and then identify sensitive data 111 contained therein.

Although the sensitive data 111 described above typically exists in the form of text, it is appreciated that in some embodiments, sensitive data 111 can exist in other forms. For example, in some embodiments, sensitive data 111 can correspond to a portion of an image or video, such as a face or other identifiable personal information. Accordingly, surveillance module 105 can be configured to use other suitable pattern recognition techniques, such as facial recognition and/or artificial intelligence (AI) to identify sensitive data 111. It is further appreciated that irrespective of the type or form of data asset 109 and/or sensitive data 111, sensitive data 111 can be considered as being a portion of data asset 109 and not the entire data asset 109 itself. In other words, sensitive data 111 can correspond to a subset of data contained within data asset 109, the sensitive data 111 being capable of being distinguished and selectively extracted from other data contained in the data asset 109.

Upon identifying sensitive data 111, the data surveillance module 105 can be configured to extract such sensitive data 111 from data asset 109 for storage, monitoring and consultation at another point in time. As can be appreciated, in addition to extracting sensitive data 111, surveillance module 105 can be configured to extract context information associated with the sensitive data 111, for example to assist in validation that sensitive data 111 was correctly identified and/or to assist in understanding the content and/or relevance of sensitive data 111 during a subsequent consultation. Such context information can, for example, include a portion of data asset 109, such as a subset of data contained within data asset 109 that is different than the sensitive data 111.

Figure 2:
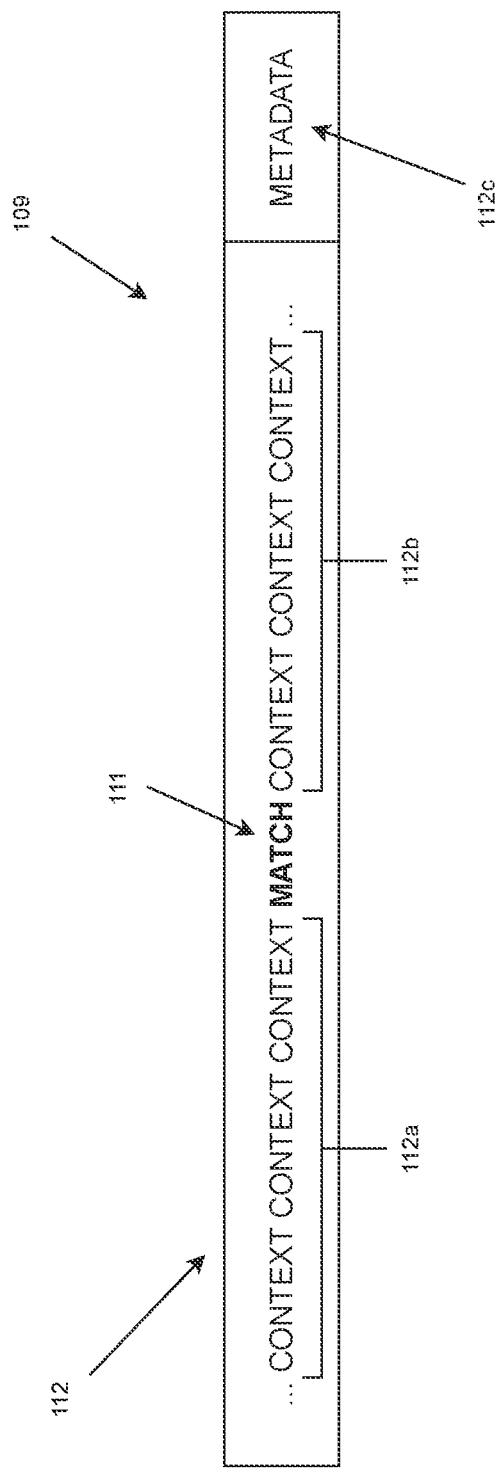
FIG. 2 is a schematic illustrating an exemplary data asset and sensitive data and context information extracted therefrom.
Figure 3:
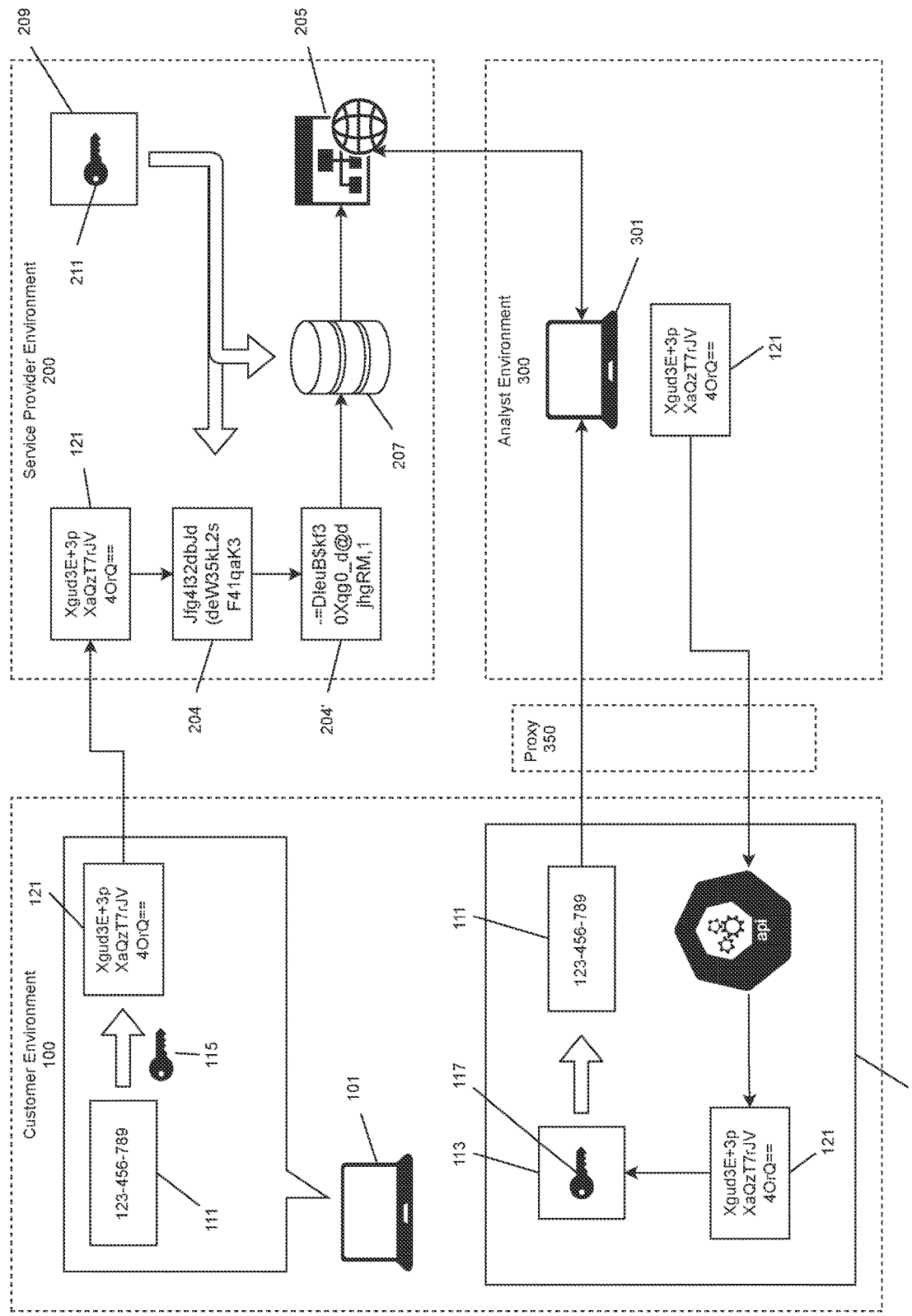
FIG. 3 is a schematic illustrating an exemplary method for secure collection and display of sensitive data, according to an embodiment.
Figure 4A:
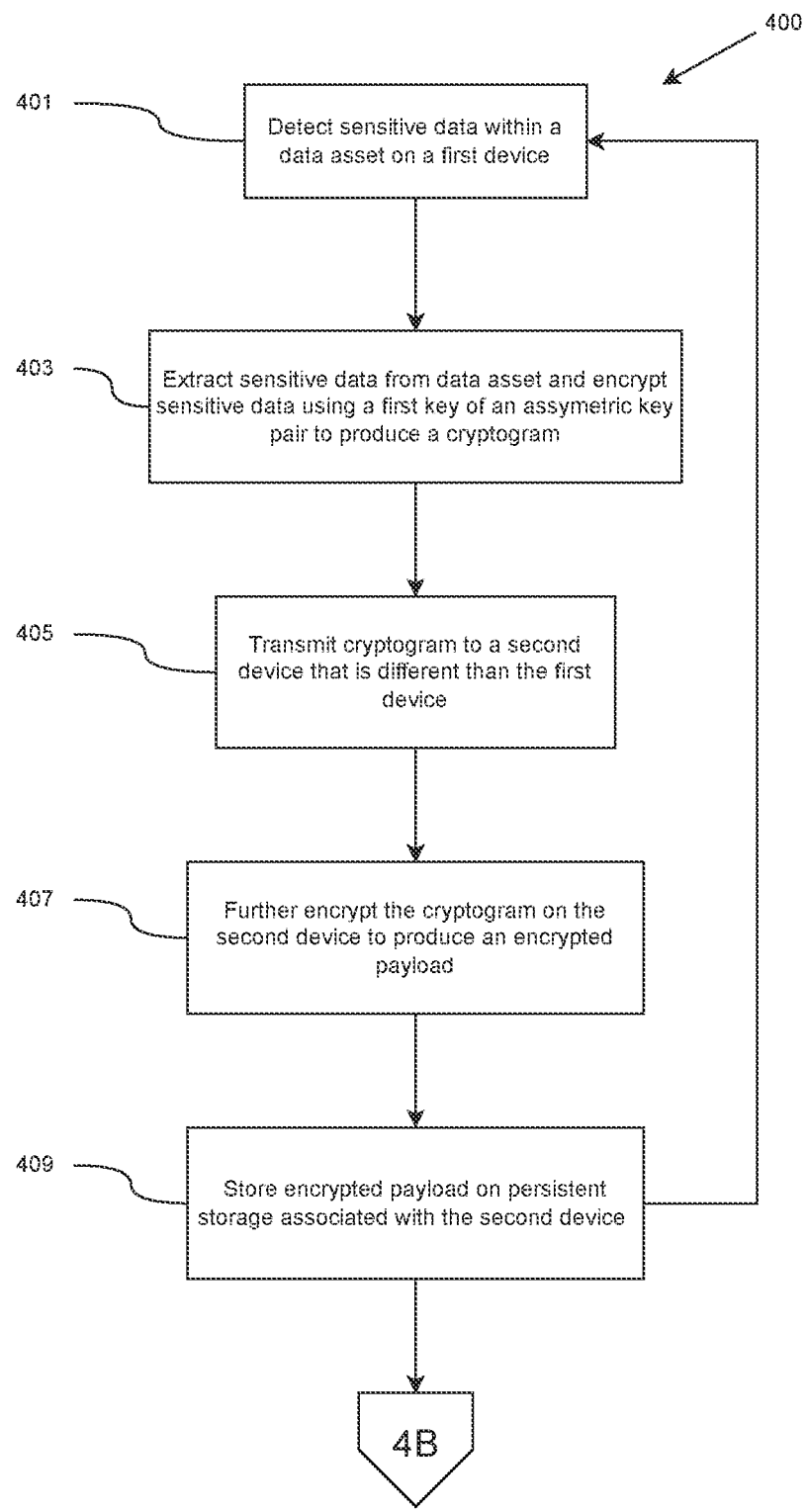
FIGS. 4A to 4C are a flowchart of the method for secure collection and display of sensitive data illustrated in FIG. 3.
Figure 4B:
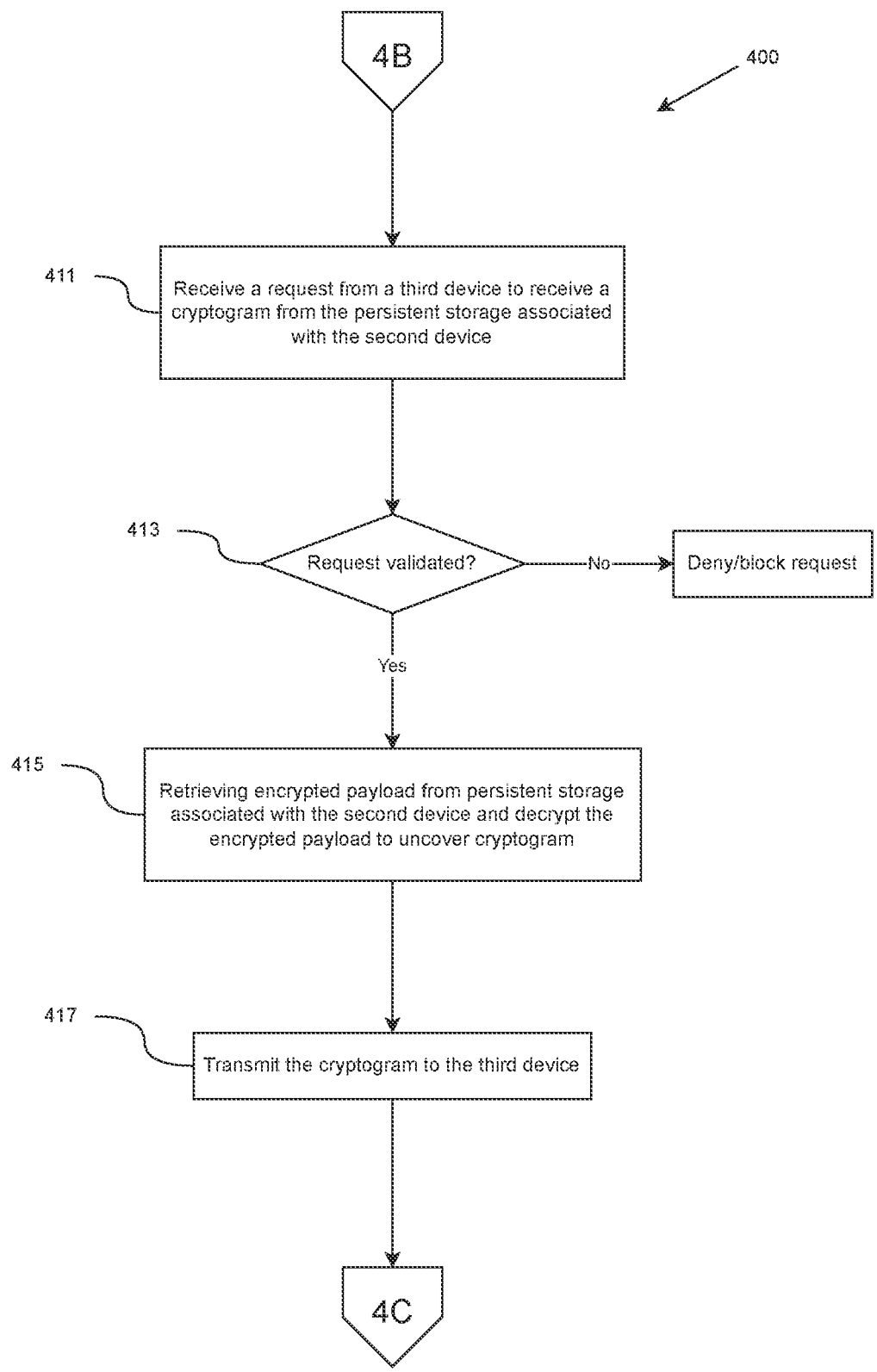
Figure 4C:
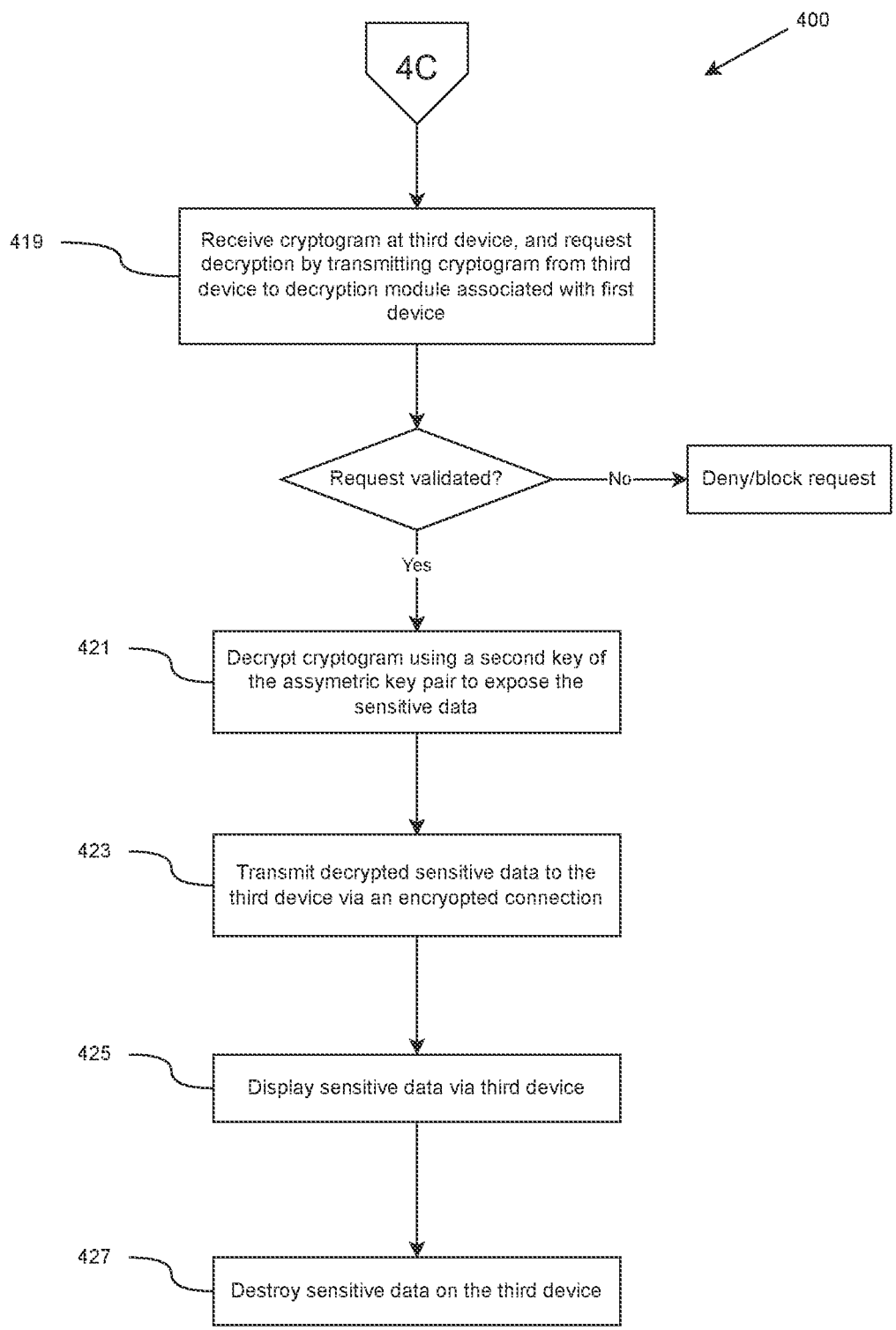

By way of example, and with reference to FIG. 2, an exemplary data asset 109 containing text data is shown. Upon identifying sensitive data 111 contained within the text data (i.e. corresponding to a match of a defined pattern), the sensitive data 111 is extracted along with context information 112. In the present embodiment, the context information includes text data preceding 112a and text data following 112b the identified sensitive data 111. The length of extracted contextual text data 112a, 112b can, for example, be limited to a predefined and/or configurable number of characters immediately before and after the sensitive data 111. The context information can further include metadata 112c associated with the data asset 109 to assist in describing the context of the file in which the sensitive data 111 was identified. Such metadata 112c can, for example, include a name of the file, location of the file, a date of creation, modification or most recent access of the file, size of the file, etc.

Although an example has been described in the context of sensitive data 111 corresponding to text data, it is appreciated that context information can be extracted for other types of sensitive data 111 in other types of data assets as well. For example, if sensitive data 111 corresponds to a portion of an image, the context information 112 extracted along with sensitive data 111 can include a defined margin around the matched portion of the image. Similarly, if sensitive data 111 corresponds to a portion of an audio file, the extracted context information 112 can include a buffer before and after a matched sequence in the audio file.

Referring back to FIG. 1, the service provider software 103 further includes a data encryption module configured to encrypt sensitive data 111 and corresponding context information 112 once extracted from data assets 109. The extracted data is encrypted directly on the customer endpoint 101 (i.e. on the same device from which the sensitive data was identified and extracted) using a provided encryption key. Sensitive data 111 and corresponding context information 112 encrypted in this fashion can be referred to as a cryptogram. In the illustrated embodiment, the provided encryption key corresponds to a public encryption key 115 controlled by the customer. The public encryption key 115 can be generated on and/or retrieved from a customer key vault 113 that is part of the customer environment 100. The key vault 113 can correspond to any suitable system and/or service that allows generating and/or safeguarding cryptographic keys. By way of example, the key vault 113 can correspond to a Microsoft Azure Key Vault service, although it is appreciated that other services are possible.

It should further be appreciated that the public encryption key 115 can be associated and/or paired with a corresponding private key 117 also stored in the customer key vault 113. The private key 117 can subsequently be used to decrypt the cryptogram that was created using the public key 115, for example using a customer decryption module 119. As can be appreciated, the private key 117 is referred to as being "private" in that it remains within the customer environment 100, is not shared with third parties and/or external devices, and preferably never leaves the key vault 113. This is in contrast to the "public" key 115 which may be communicated to other parties or devices as needed. For example, the public key 115 may be copied within the service provider software 103 and/or may be communicated to the service provider environment 200.

In the illustrated embodiment, the customer decryption module 119 is provided as part of the customer environment 100. In this fashion, decryption of any cryptogram containing sensitive data 111 can occur within the customer environment 100, allowing for control of sensitive data 111 to be maintained by the customer. As can be appreciated, any suitable asymmetric cryptography techniques can be used by data encryption module 107 and customer decryption module 119 to encrypt and decrypt using the public 115 and private 117 keys. Moreover, any suitable service can be used to implement customer decryption module 119, including key vaults that provide decryption functions, such as the Microsoft Azure Key Vault service.

The data encryption module 107 can further be configured to communicate with service provider environment 200, such as with at least one server 3 controlled by service provider, in order to transfer cryptograms for storage offsite from the customer environment 100. In the present embodiment, the service provider environment 200 includes a data collection module 201 that is configured to communicate with, and receive cryptograms from, the customer environment 100. The data collection module 201 can, for example, be implemented on the at least one server 3.

The service provider environment 200 also includes a data encryption module 203 for encrypting the cryptograms received via data collection module 201. The data encryption module 203 can also be implemented on the at least one server 3, for example. As can be appreciated, this can provide an extra layer of security in that the cryptogram containing sensitive data 111 is encrypted again before being stored in the service provider environment 200. A cryptogram that is again encrypted in this manner can be referred to as an encrypted payload. The data encryption module 203 can encrypt the cryptogram using any suitable means. By way of example, in the present embodiment, the data encryption module 203 utilizes symmetric encryption keys 211 stored in a service provider key vault 209 within the service provider environment 200. The service provider key vault 209 can correspond to any suitable system and/or service that allows generating and/or safeguarding cryptographic keys. As an example, the key vault 209 can correspond to a Microsoft Azure Key Vault service, although it is appreciated that other services are possible.

Although in the present embodiment, the data encryption module 203 uses symmetric encryption keys 211, it is appreciated that different cryptographic techniques and corresponding keys can be used in other embodiments. Moreover, the data encryption module 203 can employ different strategies to further increase the security of encrypted payloads within the service provider environment 200. As an example, in some embodiments, the data encryption module 203 can encrypt cryptograms a plurality of times using different encryption keys for each encryption. In some embodiments, the data encryption module 203 can encrypt cryptograms using different encryptions keys associated with different customers and/or different customer environments. For example, a cryptogram received from a first customer environment controlled by a first customer can be encrypted using a first encryption key, whereas a second cryptogram received from a second customer environment controlled by a second customer can be encrypted using a second encryption key.

Encrypted payloads generated using encryption module 203 can be stored for an indeterminate period via secure storage module 207 also provided as part of service provider environment 200. As can be appreciated, storage module 207 can correspond to any non-transitory medium that allows for encrypted payloads to be stored and accessed at a later date, and can include one or more servers, storage disks, databases, etc. which can, for example, be implemented on the at least one server 3. Upon request from an authorized party, the secure storage module 207 can be configured to decrypt the encrypted payload using encryption keys 211, such that the data contained therein can be consulted. As can be appreciated, once an encrypted payload is decrypted using encryption keys 211, sensitive data 111 will not be exposed. Instead, the decrypted data will correspond to the cryptogram that was originally received from customer environment 100. Further decryption by the customer will be required in order for the sensitive data 111 to be exposed.

A consultation module 205 can be provided for allowing authorized parties to access cryptograms that are stored as encrypted payloads in secure storage module 207 for consultation or other consumption purposes. The consultation module 205 can correspond to any suitable interface and/or service that enables communication with a consultation or consumption device and/or that can act as a gatekeeper for controlling access to cryptograms. In the present embodiment, the consultation module 205 comprises a web console and/or web server implemented on the at least one server 3, although it is appreciated that other server types are possible. The web server is configured to serve web content for running a web application including a user interface (UI) for displaying sensitive data 111 and context information 112 once decrypted. The web server is also configured to serve assets to populate the UI, including cryptograms containing the sensitive data 111 and context information 112 for display. As can be appreciated, various security protocols can be implemented to ensure that the consultation module 205 only provides cryptograms to authorized parties. For example, the web server can be configured to only serve content to authorized clients and/or can only be accessible from clients on the same physical or virtual network.

In the illustrated embodiment, the consultation or consumption device communicating with the consultation module 205 corresponds to an analyst workstation 301 that is part of analyst environment 300. The analyst workstation 301 can correspond to any computing device operable by an analyst, and can include a desktop computer, laptop computer, tablet, smartphone, etc. In the present embodiment, the analyst workstation 301 includes a web browser 303 and acts as a client for communicating with the web server implemented via consultation module 205. The web browser 303 is configured to receive web content and corresponding assets, and to run a corresponding web application including a UI for display on a corresponding display device. Although in the present embodiment the workstation 301 includes a web browser 303 for running a web application, it is appreciated that other configurations are possible. For example, in some embodiments, the analyst workstation 301 can include other clients, such as a native application for communicating with the consultation module 205 and receiving and displaying data. Preferably, the analyst workstation 301 is configured to communicate with consultation module 205 via any suitable secure and/or encrypted protocol, such as HTTPS. Although an analyst workstation 301 and analyst environment 300 are described, it is appreciated that other devices and/or environments can be provided to consult and/or consume sensitive data as necessary. For example, in some embodiments, the system 1 can be configured as a mediator of sensitive data, and the consultation device can be configured to allow authorized parties to recuperate and/or retrieve copies of sensitive data.

As can be appreciated, at least some of the assets received from consultation module 205 can include cryptograms and must therefore be decrypted before their content can be displayed or otherwise consumed. Accordingly, the analyst workstation 301 can be configured to communicate with the customer environment 100 to decrypt such cryptograms. By way of example, in the present embodiment, the web application running in web browser 303 is configured to communicate with customer decryption module 119 via an application programming interface (API). More specifically, the web application can transmit cryptograms received from consultation module 205 to customer decryption module 119 for decryption. The customer decryption module 119 can be configured to validate that sensitive data 111 is permitted to be viewed on analyst workstation 301, and if permitted, the cryptogram can be decrypted using private key 117 from the customer key vault 113. The decrypted sensitive data 111 and corresponding context information 112 can be subsequently returned to the analyst workstation 301 for display via the application running in web browser 303. As can be appreciated, any suitable secure communication techniques can be employed to ensure that sensitive data 111 is communicated securely between customer decryption module 119 in customer environment 100 and the analyst workstation 301 in analyst environment 300. By way of example, the web application running in browser 303 can communicate with customer decryption module 119 via an encrypted communication protocol, such as HTTPS.

As can be appreciated, the above-described system 1 can be used to implement a method for secure collection and retrieval and/or display of sensitive data. With reference to FIGS. 3 and 4A to 4C, an exemplary method 400 is shown according to an embodiment.

In the illustrated embodiment, the method 400 includes a first step 401 of detecting, by a customer endpoint 101 within a customer environment 100, sensitive data 111 within a data asset. As explained above, detecting sensitive data 111 can be carried out by a processor executing code on the customer endpoint 101 and configured to continuously and/or regularly monitor data assets stored on, or accessible from, customer endpoint 101. As can be appreciated, the code corresponds to service provider software 103 that is deployed on the customer endpoint 101. Accordingly, the method can include preliminary steps for deploying the service provider software 103 and registering it with the service provider, including registering the customer's authentication service and key vault through the service provider software 103, and providing the service provider software 103 with access to public keys 115 that can subsequently be used for encryption.

Upon detecting sensitive data 111, a subsequent step 403 can comprise extracting, by the customer endpoint 101, sensitive data 111 from the data asset in which the sensitive data 111 is located, and encrypting the sensitive data 111 on the customer endpoint 101 to produce a cryptogram 121. The sensitive data 111 can be encrypted using a public key 115 that is part of an asymmetric key pair that also comprises a private key 117 controlled by the customer. As can be appreciated, in some embodiments, the sensitive data 111 can be encrypted immediately following detection. Moreover, in some embodiments, the method can further include extracting context information 112 associated with the sensitive data 111 and/or associated with the data asset in which sensitive data 111 was detected, and encrypting the context information 112 as part of the cryptogram 121 along with sensitive data 111.

In the illustrated embodiment, the customer endpoint 101 is pre-configured with the public key 115. It is appreciated, however, that in some embodiments, the method 400 can include a preliminary process of configuring the customer endpoint 101 with the public key 115. This preliminary process can include, for example, the steps of authenticating the customer endpoint 101 with an authentication service (such as Azure Active Directory or other similar service) and validating that the customer endpoint 101 is allowed access to a given customer key vault 113. Once validated, the public key 115 stored in the customer key vault 113 can be retrieved and transmitted for storage on the customer endpoint 101. In other embodiments, the public key 115 can be stored in service provider environment 200 following registration or deployment of the service provider software 103. In such cases, the service provider software 103 can retrieve the required public keys 115 from service provider environment 200 when needed.

As can be further appreciated, the customer can rotate their encryption keys on a regular basis if desired for increased security. Accordingly, once a customer generates a new key pair, the customer endpoint 101 can be re-configured with the new public key 115. In some embodiments, the public key 115 can be pushed to the service provider software 103 from service provider environment 200 or from customer key vault 113. For example, when the customer renews their keys, service provider environment 200 can be notified and/or can be provided with the new public key. The service provider environment 200 can in turn notify the service provider software 103 and/or transmit the new public key to service provider software 103. In some embodiments, the service provider software 103 can query service provider environment 200 or customer key vault 113 on a regular basis or on demand to retrieve an updated public key 115 if available. In embodiments where customer keys are rotated, the service provider environment 200 and/or customer key vault 113 can maintain an archive of previously used encryption keys. Such an archive can include an indicator to assist in identifying the specific encryption key associated with a given cryptogram. For example, the archive can maintain an indication of a time period during which particular encryption key pairs were in use. Such an indication can eventually be used to identify the appropriate private key that will need to be used to decrypt a given cryptogram.

Once cryptogram 121 has been generated, a subsequent step 405 can comprise transmitting the cryptogram 121 from the customer endpoint 101 to a different device or server. In the present embodiment, the cryptogram 121 is transmitted to a server that is part of service provider environment 200. As can be appreciated, the server can be a remote server that is physically distant from the customer endpoint 101, such as in a different room, building, campus, city, country, etc., and/or a server that is on a different physical or logical network than the customer endpoint 101. As an example, the server can be part of a cloud service that is operated by service provider. The cryptogram 121 can be provided to server using different mechanisms, for example via an API provided by service provider environment 200, and via a secure connection, such as HTTPS. In some embodiments, the cryptogram 121 can be transmitted to service provider environment 200 with additional information or tags to assist with identifying the cryptogram 121, such as an identifier (ID) corresponding to the source of the cryptogram 121 (for example the particular endpoint from which the cryptogram 121 was received), an ID corresponding to the customer to which the sensitive data in the cryptogram belongs, an ID corresponding to a type of sensitive data contained within the cryptogram, an ID to uniquely identify the cryptogram and/or the sensitive data stored therein, a timestamp corresponding to when the sensitive data was collected and/or when the cryptogram was created, etc. The additional information can further include information relating to the security context of the cryptogram, such as an ID corresponding to the key and/or key vault that was used to encrypt the sensitive data (ex: an Azure Key ID or Vault ID), an ID corresponding to an authentication service or account that should be used to authorize subsequent access to cryptogram (ex: an Azure Active Directory Client ID), among others.

Upon receiving cryptogram 121 at service provider environment 200, a subsequent step 407 can comprise further encrypting the cryptogram 121 to produce an encrypted payload 204. The cryptogram 121 can be encrypted using one or more encryption keys 211 obtained from a service provider key vault 209. In the present embodiment, the cryptogram 121 is encrypted twice, thus producing a doubly encrypted payload 204'. As can be appreciated, a different encryption key 211 can be used for each encryption operation. In some embodiments, the different encryption keys can be stored in separate key vaults controlled by the service provider. In some embodiments, the encryption keys 211 can be rotated on a regular basis. In such embodiments, the service provider key vault 209 can maintain an archive of previously used encryption keys. Such an archive can include an indicator to assist in identifying the specific encryption key associated with a given encrypted payload. For example, the archive can maintain an indication of a time period during which particular encryption keys were in use.

Once encrypted, a subsequent step 409 can comprise storing the encrypted payload 204, in this case the doubly encrypted payload 204', in secure persistent storage 207 within the service provider environment 200, for access at a later date. As can be appreciated, the encrypted payload 204, 204' can be stored along with the additional information or tags associated with the cryptogram 121 within the payload, for example to assist in subsequently locating and/or identifying encrypted payloads 204, 204' of interest, and/or to provide an indication about how the cryptogram 121 can be decrypted and/or how to validate whether access to the cryptogram should be allowed. Although in the present embodiment the encrypted payload corresponds to a cryptogram that was additionally encrypted within service provider environment 200, it is appreciated that in some embodiments the cryptogram 121 can be stored without additional encryption, and thus that the encrypted payload 204 can correspond directly to the cryptogram 121.

The above-recited steps 401 through 409 can be repeated to continue detecting additional sensitive data 111 and securely storing such information within cryptograms 121 and encrypted payloads 204 in the secure persistent storage 207. In some embodiments, sensitive data that is detected and transmitted to service provider environment in a cryptogram may already be stored within the service provider environment. In such cases, the corresponding payload stored in the persistent storage 207 can be updated, and/or can be tagged to indicate when the sensitive data contained therein was first detected or seen, and when the sensitive data contained therein was last detected or seen.

Following storage within service provider environment 200, subsequent steps can be carried out for retrieving and securely displaying cryptograms. An initial step 411 can comprise receiving a request to receive a cryptogram. The request can be received by device and/or service associated with the secure persistent storage 207. In the present embodiment, the request is received by a consultation module 205 within the service provider environment 200, which implements a web console. The request is received from an analyst workstation 301 that is within an analyst environment 300, although it is appreciated that in some embodiments, the request can be received from an analyst workstation 301 (or other suitable device) that is within customer environment 100 or service provider environment 200. As can be appreciated, the request can include any information required to identify one or more cryptograms being requested, such as an ID corresponding to the source of the cryptogram(s) an ID corresponding to the customer to which the sensitive data in the cryptogram(s) belong, an ID corresponding to a type of sensitive data contained within the cryptogram(s), an ID uniquely identifying a given cryptogram, a time period in which the cryptogram was created, etc.

Upon receiving a request to receive a cryptogram, the request can be validated 413 to ensure that the requestor is authorized to receive the cryptogram. As can be appreciated, any suitable authentication techniques can be used. For example, this can include validating login credentials of a user operating analyst workstation 301 to confirm that the user has been authorized by a particular customer to access their cryptograms. In some embodiments, this can include authenticating the user through an authentication service controlled by the customer and/or within the customer environment 100, such as Azure Active Directory. If validation fails, the request can be denied or blocked.

In some embodiments, validating the request can include verifying that the request is being received from a device on a trusted network. As an example, it can be verified that analyst workstation 301 is on the same physical or logical network as consultation module 205, or on another authorized physical or logical network that is part of customer environment 100 and/or service provider environment 200. As can be appreciated, when an analyst is working remotely and is thus part of a distinct analyst environment 300, a VPN connection can be established to place analyst workstation 301 on a logical network within the customer environment 100 or within service provider environment 200. In such cases, validating the request can include verifying that the request is being received from an analyst workstation 301 that is connecting via a VPN authorized by the customer and/or the service provider.

In some embodiments, each request for a cryptogram can be validated. In other embodiments, a single preliminary validation step can be carried out. For example, the analyst workstation 301 can be required to log in to the web console and/or application implemented by consultation module 205 in order to send requests for cryptograms therethrough. Once logged in, the consultation module 205 can respond to requests without further authentication, and/or by using cryptographic protocols negotiated during the login process. Where the login fails and/or the analyst workstation 301 is not on an authorized network, requests to consultation module 205 can simply be blocked.

Once the request is authenticated, a subsequent step 415 can include retrieving and decrypting one or more corresponding encrypted payloads 204. The persistent storage 207 can include a database, and retrieving the encrypted payloads 204 can include querying the database according to the request. As an example, this can include querying the database to retrieve one or more encrypted payloads 204 containing cryptograms originating from a specified source, belonging to a specified customer, corresponding to a specified type of sensitive data, matching a specified unique ID, originating from a specified time period, etc. The retrieved encrypted payloads 204 can subsequently be decrypted within the service provider environment 200 to uncover the cryptograms 121 contained therein, for example using one or more encryption keys 211 from service provider key vault 209. As can be appreciated, in embodiments where the encrypted payloads were encrypted multiple times before being stored (ex: doubly encrypted payloads 204'), multiple decryption operations can be applied using one or more different encryption keys 211. In embodiments where the encryption keys 211 are rotated, the decryption operation can include a preliminary step of identifying the appropriate encryption keys to use to decrypt the encrypted payload 204. The appropriate encryption key can correspond to a currently active encryption key, or to an inactive/archived encryption key that was used to encrypt the encrypted payload. For example, this can include determining a time period in which the encrypted payload 204 was generated and identifying an encryption key that was active during that period.

The retrieved cryptograms 121 can then be transmitted 417 to the device that made the request, in this case the analyst workstation 301. As can be appreciated, transmitting the cryptogram 121 can also include transmitting additional information relating to the security context of the cryptogram. This can include, for example, an ID corresponding to the key and/or key vault that was used to encrypt the sensitive data (ex: an Azure Key ID or Vault ID), an ID corresponding to an authentication service or account that should be used to authorize subsequent access to cryptogram (ex: an Azure Active Directory Client ID), etc.

Upon receiving the cryptograms 121, an additional decryption operation is required in order for the sensitive data 111 therein to be exposed. Decryption of such cryptograms 121 is controlled by customer and is preferably carried out within customer environment 100. Thus, a subsequent step 419 can comprise transmitting one or more cryptograms 121 from the analyst workstation 301 to the customer environment 100 for decryption. As can be appreciated, any suitable methods can be used to transmit the cryptograms 121. As an example, the analyst workstation 301 can interface with an API implemented via customer decryption module 119. In the present embodiment, the customer decryption module 119 is implemented via the Microsoft Azure Key Vault service. Accordingly, transmitting the cryptogram 419 can comprise requesting a decrypt operating through the Microsoft Azure Key Vault API, for example by sending a corresponding POST request via HTTPS to the client's Microsoft Azure Key Vault service, with the request body including the cryptogram as the value to be decrypted.

In some embodiments, additional security measures can be implemented, and additional steps may be required in order to send a decrypt request to the customer decryption module 119. For example, a key vault access token may be required in order to initiate a decrypt operation, for example via the Microsoft Azure Key Vault API. Accordingly, an additional step can include sending a request, from the analyst workstation 301, to the customer's authentication service (such as Azure Active Directory) for a key vault access token. The request can include an Azure Key ID/Vault ID and Active Directory Client ID received with the cryptogram to be decrypted. In this fashion, the customer's authentication service can determine whether the user on the analyst workstation 301 is permitted to decrypt the cryptogram. If the user is authenticated, the customer's authentication service can return a corresponding key vault access token to the analyst workstation 301 which can subsequently be included in the decrypt operation send to the customer decryption module 119.

As another example, the customer decryption module 119 may be configured to accept connections only from authorized or whitelisted addresses. Accordingly, communications between analyst workstation 301 and customer decryption module 119 can be relayed via a proxy 350 that is part of the customer environment 100 or service provider environment 200.

Once cryptogram 121 is received by customer decryption module 119, it can be decrypted to expose the sensitive data 111 contained therein 421. The cryptogram 121 can be decrypted using a private key 117 that corresponds to a second key of the asymmetric key pair that includes the public key 115 that was initially used to encrypt the cryptogram 121. As can be appreciated, the request to decrypt can be validated prior to decrypting. For example, in the present embodiment the request to decrypt include a key vault access token which provides temporary authorized access to the required private key 115 of the customer's key vault 113. Without such token included in the request, it will not be possible to access the required keys and thus not possible to decrypt the cryptogram 121. It is appreciated that other techniques can be used to validate the decrypt request and deny or block decryption if needed. As can be appreciated, in embodiments where the customer keys 115, 117 are rotated regularly, the process of decrypting the cryptogram 121 can include a preliminary step of identifying a private key 117 that corresponds to the public key 115 that was used to produce cryptogram 121. The private key 117 can be one that is paired to a currently active public key 115, or to a private key 117 that is paired with an inactive/archived public key 115 that was used to encrypt the encrypted payload. For example, this can include determining a time period in which the cryptogram 121 was generated and identifying a private key 117 associated with the public key 115 that was active during that period.

In a subsequent step 423, the decrypted sensitive data 111 can be sent back to the device that made the decryption request, in this case corresponding to the analyst workstation 301. Preferably, the sensitive data 111 is transmitted via an encrypted connection, for example via HTTPS. The data may further be relayed through a proxy 350, if needed.

Upon receiving the sensitive data 111, such data can be consumed as needed. In the present embodiment, the sensitive data 111 is displayed or otherwise presented 425 so that it can be assessed by an analyst operating the analyst workstation 301. The sensitive data 111 can, for example, be used to populate a UI, such as in an application running natively on analyst workstation 301, or in a web application provided by consultation module 205 and rendered in web browser 303.

In a last step 427, the copy sensitive data 111 that exists on the device that made the decryption request (in this case the analyst workstation 301) can be destroyed. In some embodiments, when sensitive data 111 is received by a requesting device, it can be stored exclusively within volatile memory of the device such that it is automatically deleted, such as when the web browser (or other application) is closed, when the page is refreshed, or when another page is visited. In some embodiments, a data clean-up operation can be carried out, such that sensitive data 111 is explicitly deleted upon request, for example after a configurable period of inactivity, after a user logs out of the device, and/or after any other suitable event.

In the present embodiment, the sensitive data 111 can be displayed on analyst workstation 301 as part of a UI of an analysis application that allows analysts to search for and analyze sensitive data identified within the customer environment 100. As can be appreciated, when rendering screens/pages of the analysis application, the decrypted sensitive data 111 may not be immediately ready for display. Accordingly, a screen/page that is to include sensitive data 111 can be rendered in full using placeholders for the sensitive data 111 while such sensitive data 111 is loaded asynchronously. Once the sensitive data is loaded, the placeholders can be replaced with the relevant sensitive data 111.

Figure 5:
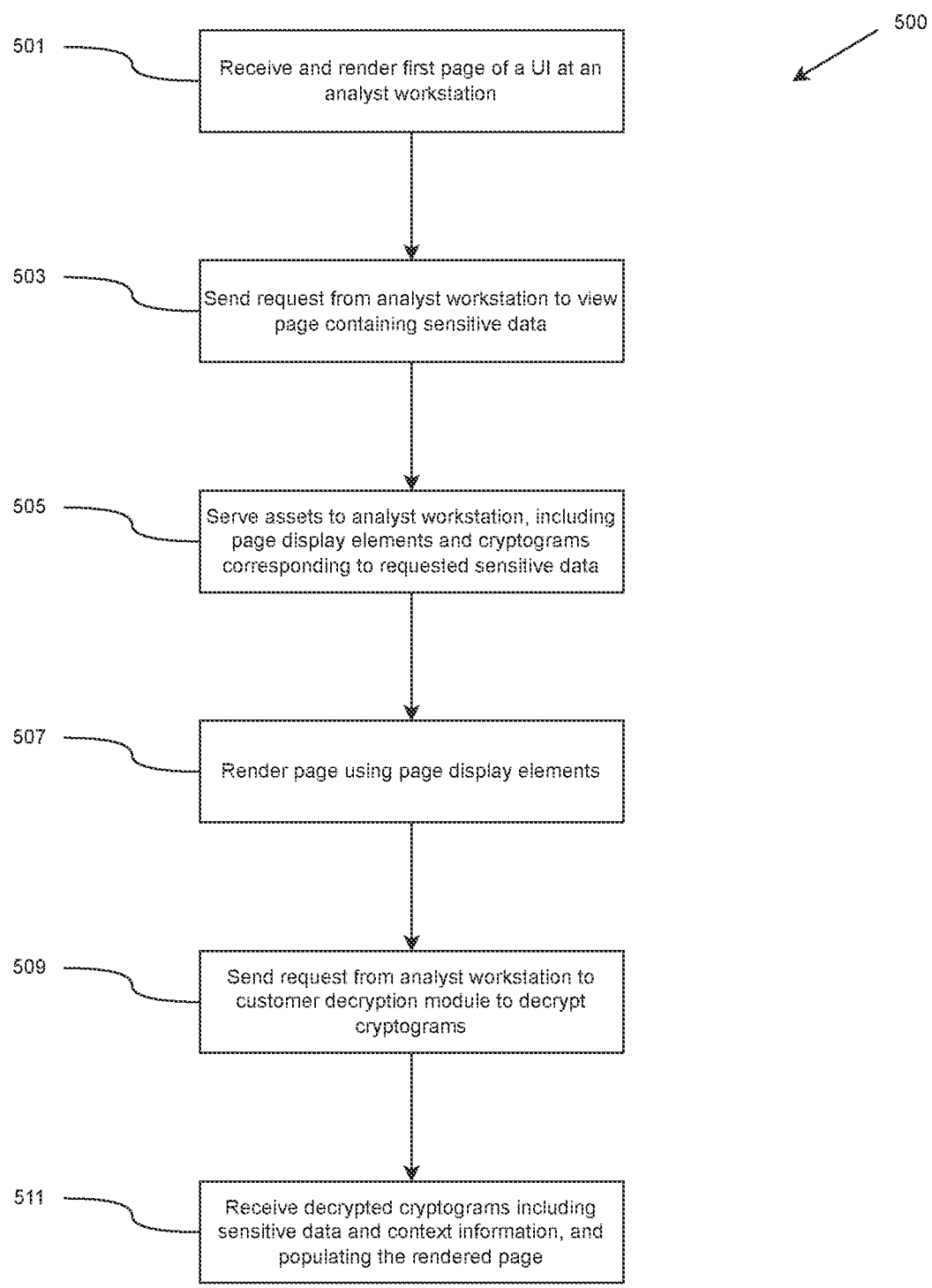
FIG. 5 is a flowchart of a method for asynchronously loading and displaying sensitive data, according to an embodiment.

With reference to FIG. 5, an exemplary method 500 for asynchronously loading and displaying sensitive data is shown according to an embodiment. The described embodiment relates to asynchronously loading sensitive data within a web application on an analyst workstation, but it is appreciated that similar steps can be applied for other types of applications, such as a native application running on an analyst workstation or other device.

A first step 501 can include receiving and rendering a first page of a UI. The first page can be received from a web server implemented via a consultation module and rendered on a display of an analyst workstation. The UI can correspond to an analysis application and can include controls allowing a user to send a request to view sensitive data. Such controls can, for example, include controls for allowing a user to search for and filter sensitive data based on different criteria (such as the type of sensitive data), controls for allowing a user to inspect details of search results, etc.

A second step 503 can include sending, from the analyst workstation 301 to the web server, a request to view sensitive data. The request can include, for example, a request to view one or more elements of sensitive data and/or a page that includes sensitive data, such as a search results page, or a page for inspecting details of search results.

Upon receiving a request to view sensitive data, the web server can serve assets to the analyst workstation that allow for sensitive data to be displayed 505. In some embodiments, for example where the analyst workstation requests a page that includes sensitive data, the assets can include web page elements that allow for the requested web page to be rendered. The assets further include one or more cryptograms containing sensitive data. As can be appreciated, the cryptogram can be retrieved from a secure storage module 207 as described above and can contain sensitive data that was originally encrypted on the device and/or within the customer environment in which it was collected.

Figure 6A:
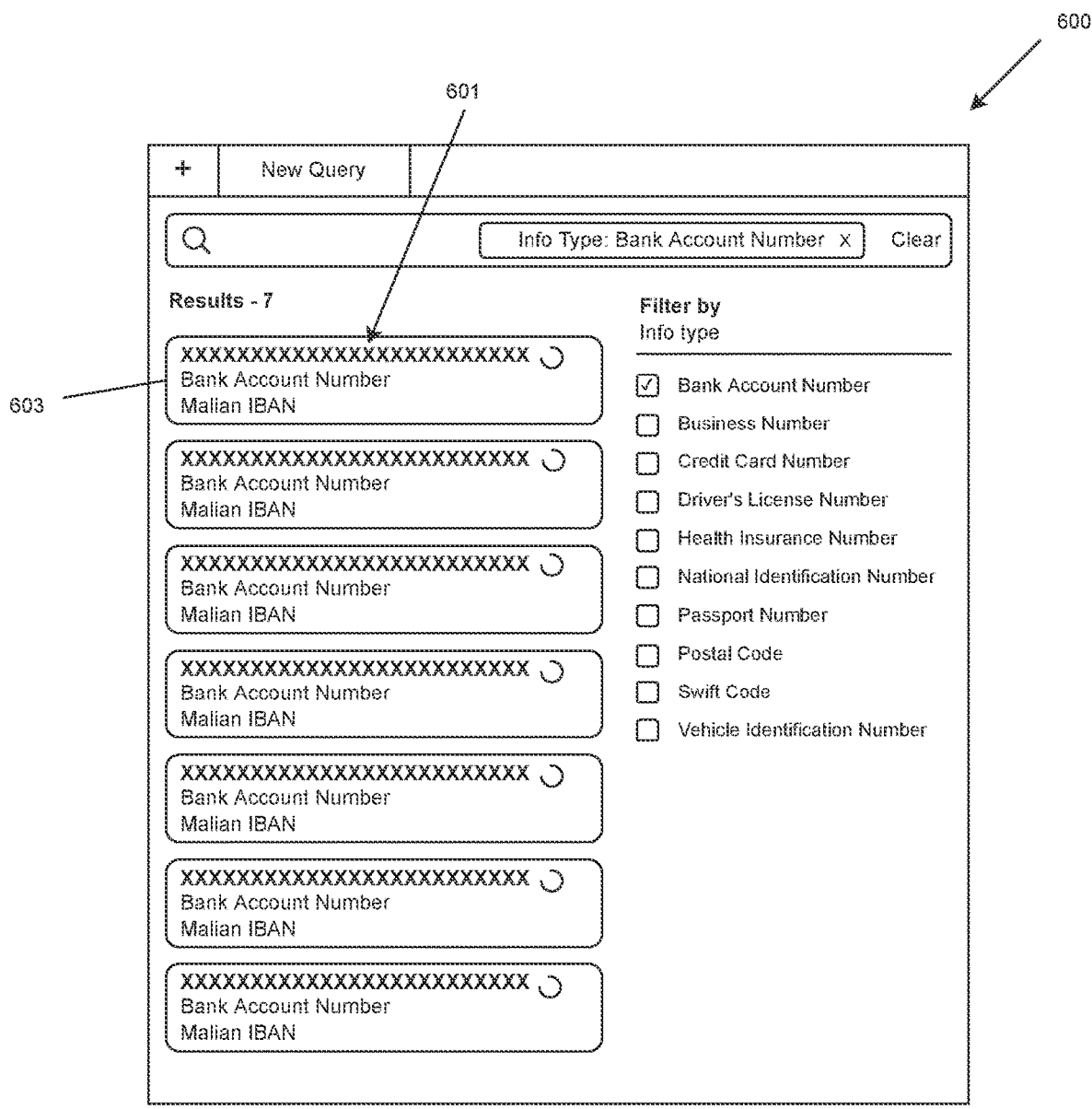
FIGS. 6A and 6B are exemplary user interfaces of a search page including sensitive data that is loaded asynchronously according to the method of FIG. 5.

Following receipt of the assets, the analyst workstation can render the requested page using the received assets 507. As can be appreciated, the sensitive data is not yet exposed because it is contained within cryptograms. Accordingly, and as shown in the exemplary search results UI of FIG. 6A, a page 600 can be rendered using all available assets, with placeholders 601 being used to indicate areas where sensitive data is to be displayed once decrypted. The placeholder can include any suitable elements to indicate incomplete information. For example, in the present embodiment, the placeholders include dummy text (ex: a series of "X" or "*" characters) and a loading icon. It is appreciated, however, that other configurations are possible. In some embodiments, the placeholders can be provided as part of assets served by web server, while in other embodiments, the placeholders can be provided by the analyst workstation.

Before the rendering of the page 600 is complete (for example, prior to or in parallel with rendering the page 600), the analyst workstation can send a request to customer decryption module to decrypt the cryptograms 509. It is appreciated that in some embodiments, the request to customer decryption module can be sent shortly after the page 600 is rendered. In some embodiments, the analyst workstation can make individual requests for each item of sensitive data, for example sending separate POST requests to the customer decryption module for each cryptogram to be decrypted. In other embodiments, the analyst workstation can group a plurality of cryptograms into a batch for which decryption is requested as part of a single request.

Figure 6B:
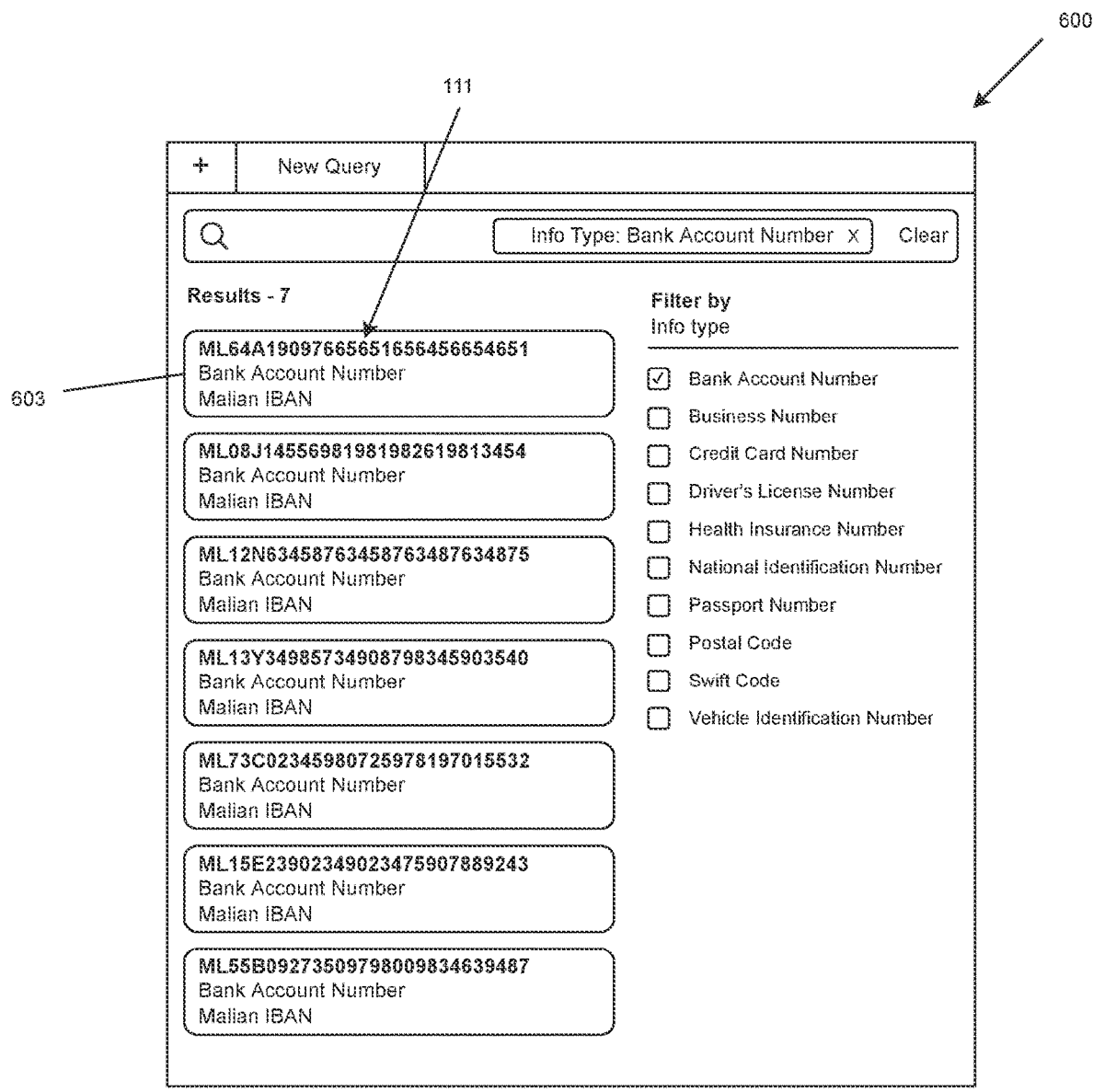

Once the cryptograms are decrypted by customer decryption module, they can be received by analyst workstation and used to populate the relevant sections of the UI 511. As shown in the exemplary search results UI of FIG. 6B, the UI can be updated such that placeholders 601 can be replaced with the corresponding sensitive data 111. In some embodiments, all placeholders can be replaced at once after a batch of sensitive data 111 is received, while in other embodiments each placeholder can be individually replaced as corresponding individual elements of sensitive data 111 are received. In some cases, for example if the workstation could not successfully authenticate with the customer decryption module, the analyst workstation can receive and error, and can update the UI to reflect such error instead of populating sensitive data 111.

As can be appreciated, upon receiving decrypted cryptograms from web server, a subset of the received data can be used to populate and/or automatically update the UI, whereas at least some remaining data can be retained in memory temporarily for display upon request. For example, decrypted cryptograms can include sensitive data 111 along with additional information such as context information 112. In the illustrated embodiment, only sensitive data 111 is used to automatically populate the UI and replace placeholders. However, context information 112 is retained in volatile memory in case an analyst would like to consult such information.

As an example, an analyst can click on a result 603 in the search page 600 in order to display detailed information relating to such result 603. As shown in the exemplary result detail UI 700 of FIG. 7, the sensitive data 111 can be displayed along with corresponding context information 112, including data preceding and following the sensitive data 112a, 112b, and metadata 112c relating to the sensitive data and/or the data asset from which it was extracted, including a name of the file, location of the file, a date of creation, modification or most recent access of the file, size of the file, etc.

In the illustrated embodiment, the detailed results page 700 shows elements of sensitive data 111 detected and extracted from a given data asset. The page 700 is initially loaded with two elements of sensitive data 111 but includes a control 701 that allows sending an asynchronous request to load additional sensitive data 111. In some embodiments, the analyst workstation receives a plurality of cryptograms corresponding to sensitive data when loading the page 700, and only requests decryption of a subset of said cryptograms (in this case the first two) to populate the page. Upon receiving a request via control 701, the analyst workstation can send requests to customer decryption module to decrypt additional cryptograms to further populate the UI 700. In some embodiments, the analyst workstation receives a plurality of cryptograms corresponding to sensitive data when loading the page 700, and requests decryption of all of the received cryptograms (in the present embodiment, only two cryptograms would have been received). Upon receiving a request via control 701, the analyst workstation can send a request to web server for additional cryptograms and, upon receive of said additional cryptograms, send corresponding decryption requests to customer decryption modules to decrypt the additional cryptograms to further populate the UI 700.

The above-described systems and methods can provide several advantages that allow for convenient yet secure display and/or consumption of sensitive data. For example, as mentioned above, reporting generic results when searching for sensitive data using existing tools can create problems because analysts may not trust results due to many false positives. To validate results, analysts usually need to find a given file and open it to examine its content further. This results in a situation where the analyst requires wholesale access to several data sources to obtain the files for examination. This process (aka the treasure hunt) is lengthy and frustrating for risk analysts. With the rising volume and velocity of data, it becomes impractical.

The above-described systems and methods help to prevent the "treasure hunt" problem by presenting detailed results to analysts, including the sensitive data match, context, and file information. This approach allows the analyst to assess if the detection is valid without requiring the file itself. The complete analyst validation workflow can be conducted in the solution, saving time and reducing the risk associated with wholesale access to multiple data sources.

Given that the systems and methods can be implemented as a software-as-a-service solution, there is a need for a unique architecture to ensure customer data security, particularly the sensitive data match and its context. To address this, the system implements a "Bring Your Own Key" and "Hold Your Own Key" architecture whereby customers provide and retain control over their encryption keys. In this fashion, a cloud service can be used to store encrypted payloads, whereas later retrieval and decryption can be performed in a web application layer using the customer's credentials. This can facilitate the display and consumption of sensitive data by authorized users (such as analysts) while ensuring that it is never visible or compromisable by the service provider. In other words, it is a way for a service provider to store and deliver necessary information to analysts, but without giving the service provider the ability to view or have access to such information.

Although particular embodiments and advantages have been described above, it is appreciated that these are for illustrative purposes only. Additional embodiments and advantages may become apparent to a person of skill in the art upon reading the foregoing specification. Moreover, a person of skill in the art will appreciate that various modifications and changes can be made without departing from the scope of the invention. Accordingly, the specification and figures are to be regarded in an illustrative rather than a restrictive sense, and all such modifications are intended to be included within the scope of present teachings.

The invention claimed is:

1. A system for transmitting sensitive data, the system comprising:
   at least one processor;
   at least one non-transitory storage medium operatively connected to the at least one processor, the at least one non-transitory storage medium comprising computer-readable instructions;
   the at least one processor, upon executing the instructions, being configured for:
      transmitting, to a server, a request indicative of a source of a cryptogram, the cryptogram corresponding to sensitive data encrypted using a first key;
      receiving the cryptogram from the server;
      decrypting the cryptogram using a second key to obtain the sensitive data; and
      outputting the sensitive data.

2. The system of claim 1, wherein the first key and the second key form an asymmetric pair of keys.

3. The system of claim 2, wherein the first key is a public key and the second key is a private key stored in a key vault.

4. The system of claim 1, wherein the at least one processor comprises a first processor and a second processor, the first processor being configured for performing said transmitting the request, said receiving the cryptogram and said outputting the sensitive data.

5. The system of claim 4, wherein the first processor is configured for transmitting the cryptogram to the second processor and the second processor is configured for said decrypting the cryptogram and transmitting the sensitive data to the first processor.

6. The system of claim 5, wherein the first processor is further configured for:
   transmitting a request for a vault access token to an authentication device, the vault access token providing access to the private key in the key vault,
   receiving the vault access token if a user of the first processor is authorized to decrypt the cryptogram;
   transmitting the vault access token along with the cryptogram to the second processor so that the second processor retrieves the private key from the key vault.

7. The system of claim 6, wherein the vault access token comprises a temporary vault access token providing one-time access to the private key.

8. The system of claim 4, wherein the first processor is configured for transmitting a key request to the second processor and receiving the second key from the second processor, the first processor being further configured for performing said decrypting the cryptogram.

9. The system of claim 1, wherein the request indicative of the source of the cryptogram is indicative of at least one of: an endpoint machine on which the sensitive data was detected, a file on which the sensitive data was detected, a customer to which the sensitive data belongs, a type of the sensitive data, an identification of at least one of the cryptogram and the sensitive data, a timestamp corresponding to when the sensitive data was detected, the first key, a key vault in which a second key of the asymmetric pair of keys is stored, and an authentication device configured for authorizing access to the cryptogram.

10. The system of claim 1, wherein said outputting comprises providing the sensitive data for display.

11. A system for providing access to a cryptogram, the system comprising:
at least one processor;
at least one non-transitory storage medium operatively connected to the at least one processor, the at least one non-transitory storage medium comprising computer-readable instructions;
the at least one processor, upon executing the instructions, being configured for:
receiving, from a requesting device, a request indicative of a given source of a given cryptogram, the given cryptogram corresponding to given sensitive data encrypted using a first key of an asymmetric pair of keys;
accessing a database comprising a plurality of cryptograms each associated with respective source information, the respective source information comprising at least a respective source for each one of the plurality of cryptograms;
retrieving a given one of the plurality of the cryptograms corresponding to the given source; and
transmitting, to the requesting device, the given one of the plurality of the cryptograms, the given one of the plurality of the cryptograms to be decrypted using a second key of the asymmetric pair of keys.

12. The system of claim 11, wherein the plurality of cryptograms comprises a plurality of doubly encrypted payloads, said retrieving the given one of the plurality of the cryptograms comprising retrieving a given one of the doubly encrypted payloads corresponding to the given source, the at least one processor being further configured for decrypting the given one of the doubly encrypted payloads using a decryption key to obtain a singly encrypted payload, said transmitting the given one of the plurality of the cryptograms comprising transmitting the singly encrypted payload.

13. The system of claim 12, wherein the at least one processor is further configured for receiving cryptograms and the respective source information for each one of the cryptograms, encrypting the cryptograms each using a respective encryption key to obtain the doubly encrypted payloads and storing the doubly encrypted payloads and the respective source information in the database.

14. The system of claim 12, wherein the respective source information comprises at least one of: an identification of an endpoint machine on which the given sensitive data was detected, an identification of a file on which the given sensitive data was detected, an identification of a customer to which the given sensitive data belongs, a type of the given sensitive data, an identification of at least one of the given cryptogram and the given sensitive data, a timestamp corresponding to when the given sensitive data was detected, an identification of the first key, an identification of a key vault in which a second key of the asymmetric pair of keys is stored, and an identification of an authentication device configured for authorizing access to the cryptogram.

15. The system of claim 11, the request indicative of the given source of the given cryptogram is indicative of at least one of: an endpoint machine on which the given sensitive data was detected, a file on which the given sensitive data was detected, a customer to which the given sensitive data belongs, a type of the given sensitive data, an identification of at least one of the given cryptogram and the given sensitive data, a timestamp corresponding to when the given sensitive data was detected, the first key, a key vault in which a second key of the asymmetric pair of keys is stored, and an authentication device configured for authorizing access to the cryptogram.

16. A method for transmitting sensitive data, the method being executed by at least one processor, the method comprising:
transmitting, to a server, a request indicative of a source of a cryptogram, the cryptogram corresponding to sensitive data encrypted using a first key;
receiving the cryptogram from the server;
decrypting the cryptogram using a second key to obtain the sensitive data; and
outputting the sensitive data.

17. The method of claim 16, wherein the first key and the second key form an asymmetric pair of keys.

18. The method of claim 16, wherein said transmitting the request, said receiving the cryptogram and said outputting the sensitive data are performed by a first processor, the method further comprising the first processor transmitting the cryptogram to a second processor and the second processor decrypting the cryptogram and transmitting the sensitive data to the first processor.

19. The method of claim 16, wherein said transmitting the request, said receiving the cryptogram and said decrypting and said outputting the sensitive data are performed by a first processor, the method further comprising the first processor transmitting a key request to a second processor and receiving the second key from the second processor.

20. The method of claim 16, wherein the request indicative of the source of the cryptogram is indicative of at least one of: an endpoint machine on which the sensitive data was detected, a file on which the sensitive data was detected, a customer to which the sensitive data belongs, a type of the sensitive data, an identification of at least one of the cryptogram and the sensitive data, a timestamp corresponding to when the sensitive data was detected, the first key, a key vault in which a second key of the asymmetric pair of keys is stored, and an authentication device configured for authorizing access to the cryptogram.

* * * * *